US005565233A

United States Patent [19]
Alessi

[11] Patent Number: 5,565,233
[45] Date of Patent: Oct. 15, 1996

[54] WHITE BALSAMIC VINEGAR AND PROCESS FOR PRODUCING WHITE BALSAMIC VINEGAR

[75] Inventor: Alfred Alessi, Tampa, Fla.

[73] Assignee: Vigo Importing Co., Inc., Tampa, Fla.

[21] Appl. No.: 274,187

[22] Filed: Jul. 12, 1994

Related U.S. Application Data

[63] Continuation-in-part of Ser. No. 268,544, Jul. 6, 1994, abandoned.

[51] Int. Cl.$^6$ .............................. A23L 1/221; A23L 2/08; A23L 2/10; A23L 2/68
[52] U.S. Cl. ........................... 426/650; 426/17; 426/589; 426/489
[58] Field of Search .............................. 426/650, 17, 589, 426/489

[56] References Cited

U.S. PATENT DOCUMENTS

| | | |
|---|---|---|
| 3,630,756 | 12/1971 | Smith et al. . |
| 3,935,317 | 1/1976 | Bianchi ..................................... 426/15 |
| 3,991,214 | 11/1976 | Slangan et al. . |
| 4,661,285 | 4/1987 | Harris et al. . |

OTHER PUBLICATIONS

Morton et al, *Food Flavors*, Part A, Introduction, pp. 86–88 (1982).
Diggs, Vinegar (1989) Library of Congress Cataloging in Publication Data, 664.55 88–92291, ISBN 0–9621803–0–0, First Edition, Collectors Copy, Chapters 7 and 10.
Turtura et al Ann Microbiol. Enzimol. 41(2), 1991 169–182 (Abstract only).
Delfini et al Vignevini, Bologna, 1987, 14(12) 55–60 (Abstract only).
Vinegar, Lawrence J. Diggs, 1989, Library of Congress Cataloging in Publication Data, 664.55 88–92291, ISBN 0–9621803–0–0, First edition, Collectors copy, Chapter 9.

*Primary Examiner*—Esther Kepplinger
*Assistant Examiner*—Choon P. Koh
*Attorney, Agent, or Firm*—Lowe, Price, LeBlanc & Becker

[57] ABSTRACT

White balsamic vinegar which exhibits a basic flavor profile similar to conventional red balsamic vinegar and which does not discolor light colored food is produced by blending white must with a white wine vinegar.

50 Claims, No Drawings

5,565,233

WHITE BALSAMIC VINEGAR AND PROCESS FOR PRODUCING WHITE BALSAMIC VINEGAR

This application is a Continuation-in-Part of application Ser. No. 08/268,544 filed Jul. 6, 1994, now abandoned.

TECHNICAL FIELD

The invention relates generally to white balsamic vinegar and to a method for producing white balsamic vinegar by blending the white must of grapes with white wine vinegar.

BACKGROUND ART

Balsamic Vinegar is a known comestible product with a unique flavor whose origins are reported to date back to the eleventh century. Traditional balsamic vinegar is produced from Trebbiano grapes in the Modena region of Italy, although balsamic vinegars are also produced outside of the Modena region of Italy. The basic process for producing traditional balsamic vinegar today has not changed significantly over the centuries. Basically, ripe grapes are harvested in what is called a vintage. The vintage is crushed and the resulting juice or must is left to sit on the skins for a period of time sufficient for pigments in the skins to impart color to the must. The must is then concentrated and subsequently cooked at temperatures in excess of 100° C., normally by slow heating to further concentrate the must, and to impart more color. After concentrating and cooking, the resulting red must is seasoned, blended with a red wine vinegar and then aged in a variety of casks made of different woods. Although balsamic vinegars are normally produced by essentially the same basic process, different producers may vary in their particular seasoning, method of aging, size of barrels and types of wood.

The "Traditional Balsamic Vinegar of Modena," a characterization regulated under Italian law, is considered the champagne of vinegars and is relatively expensive. Commercial balsamic vinegar, known as "Balsamic Vinegar of Modena" is regarded by the Italian government as a national product, but it is not necessarily produced in the Modena region. All known balsamic vinegars exhibit a characteristic deep red color and are referred to herein as "conventional balsamic vinegar."

Conventional balsamic vinegar is used widely for salad dressings, sauces for red meats, marinades, and garnishes on certain fruits and vegetables. However, conventional balsamic vinegar suffers from the disadvantage that it imparts unsightly discoloration or stains to food such as poultry, fish, veal and other light colored food, thereby rendering them unappealing the eye. Thus, conventional balsamic vinegar with its traditional red color is not normally used for poultry, fish, veal and other light colored meats and food.

The terms "red" and "white" are used throughout the disclosure and claims when characterizing vinegar and must as they would by one having ordinary skill in the art of producing vinegar and/or processing grapes. They are not used in such characterizations in a strict colormetric sense, but in a manner similar to characterizing "red" vis-á-vis "white" wines and wine vinegars. Thus, the characterization "white" encompasses a range from almost colorless to light amber.

OBJECTS OF THE INVENTION

One object of the present invention is to solve the above-mentioned disadvantages of conventional balsamic vinegar by formulating a balsamic vinegar which does not impart undesirable discoloration to food, such as poultry, fish, veal and other light colored food.

Another object of the invention is to produce a balsamic vinegar which does not impart undesirable discoloration to light colored foods but exhibits a basic flavor profile similar to that of conventional balsamic vinegar.

Additional objects, advantages and other features of the invention will be set forth in part in the description which follows and in part will become apparent to those having ordinary skill in the art upon examination of the following or may be learned by practice of the invention. The objects and advantages of the invention may be realized and attained as particularly pointed out in the appended claims.

DISCLOSURE OF THE INVENTION

According to the present invention, the foregoing other objects are attained by formulating a white balsamic vinegar.

Another aspect of the invention is a comestible food product comprising white balsamic vinegar.

A further aspect of the invention is a white balsamic vinegar comprising white wine vinegar.

Another aspect of the present invention is a white balsamic vinegar comprising white must and white wine vinegar.

A further aspect of the invention is a method of producing white balsamic vinegar comprising blending white must with white wine vinegar.

DETAILED DESCRIPTION OF THE PREFERRED EMBODIMENTS OF THE INVENTION

The present invention is directed to a composition which exhibits a basic flavor profile similar to conventional balsamic vinegar, but unlike conventional balsamic vinegar which exhibits a characteristic deep red color, the composition is white, i.e., white balsamic vinegar. The need for a balsamic vinegar which does not discolor light-colored food and yet exhibits a basic flavor profile similar to conventional balsamic vinegar has existed for centuries. Experimental attempts by the inventor to discolor conventional red balsamic vinegar were unsuccessful. After considerable experimentation, white balsamic vinegar was formulated which does not impart undesirable discoloration to poultry, veal, fish and other light colored foods, but which exhibits a basic flavor profile similar to conventional balsamic vinegar.

The white balsamic vinegar of the present invention, unlike conventional balsamic vinegar, contains white wine vinegar. Unlike conventional balsamic vinegar which is prepared from cooked must, the white balsamic vinegar of the present invention is prepared from white concentrated must. In a preferred embodiment, the white balsamic vinegar of the present invention comprises a blend of white must and white wine vinegar.

The amounts of white must and white wine vinegar varies depending on the relative amounts needed to achieve a desired final acetic acid content of the white balsamic vinegar, which normally ranges from about 5.2% to about 7.0%. At an acetic acid content below about 5.2% the shelf life of the white balsamic vinegar is adversely affected; while an acetic acid content in excess of about 7.0% renders it too acidic to taste. The white balsamic vinegar of the present invention preferably has an acetic acid content of about 5.5% to about 6.2%, more preferably from about 5.7% to about 6.0%, and most preferably about 5.9%. The white wine vinegar used to produce the white balsamic vinegar of the present invention can have an acetic acid content of about 6.5% to about 9.0%, preferably about 7.0% to about 8.0%, and most preferably about 7.6%. Therefore, the white balsamic vinegar of the present invention can comprise about 20% to about 35% by volume of white must and about 65% to about 80% by volume of white wine vinegar, preferably about 25% to about 30% white must and about 70% to about 75% white wine vinegar, and most preferably about 28% white must and about 72% white wine vinegar.

The grapes employed in producing the inventive white balsamic vinegar are preferably white grapes, most preferably Trebbiano grapes grown in the Modena region of Italy. The white wine vinegar employed to produce the white balsamic vinegar of the present invention may be produced in a conventional manner. It is preferred that the white wine vinegar used in preparing the inventive white balsamic vinegar is substantially colorless. It is particularly preferred that the white wine vinegar be derived from the same vintage as the white must. In a most preferred embodiment, the white must and white wine vinegar are derived from the same vintage of Trebbiano grapes grown in the Modena region of Italy.

The process for producing the white balsamic vinegar of the present invention comprises blending white must and white wine vinegar. In a preferred embodiment, a vintage of white grapes is crushed and the resulting juice or must is separated from the skins before the skins impart substantially any pigmentation or color to the must. Most preferably, the must is separated from the skins immediately after pressing. After separation, the must is concentrated by heating slowly, preferably at temperatures less than 100° C. The degree of concentration depends upon the amount of sugar and juice in the particular vintage which, in turn, depends upon the amount of rainfall which occurred during the growing season. Normally, the must is concentrated to about ⅓ to ¾ of its original volume, preferably to less than ½ of its original volume to obtain white must. Heating should not be conducted under such severe conditions or for such a lengthy period of time to yield a dark red must as in the preparation of conventional balsamic vinegar. Concentration is preferably conducted in four stages, most preferably at decreasing temperatures, progressing from the first stage to the fourth stage. Generally, concentration is conducted by heating at temperatures ranging from about 45° C. to about 99° C., for about 5 minutes to about 3 hours.

Generally, the first concentrating stage is conducted in a chamber having a maximum volume of from about 0.5 m³ to about 1.5 m³, the second stage in a chamber having a maximum volume of about 0.25 m³ to about 0.75 m³, the third stage in a chamber having a maximum volume of about 0.25 m³ to about 0.75 m³, and the fourth stage in a chamber having a maximum volume of about 2 m³ to about 6 m³. In a preferred embodiment, the first concentrating stage is conducted in a chamber having a maximum volume of about 0.75 m³ to about 1.25 m³, the second stage in a chamber having a maximum volume of about 0.4 m³ to about 6 m³, the third stage in a chamber having a maximum volume of about 0.4 m³ to about 0.6 m³ and the fourth stage in a chamber having a maximum volume of about .3 m³ to about 5 m³. In a particularly preferred embodiment, the first concentrating stage is conducted in a chamber having a maximum volume of about 1.00 m³, the second stage in a chamber having a maximum volume of about 0.53 m³, the third stage in a chamber having a maximum volume of about 53 m³ and the fourth stage in a chamber having a maximum volume of about 4.00 m³. Typically, concentration is conducted under vacuum, preferably with the vacuum decreasing from the first stage to the fourth stage. Concentration is preferably conducted in a chamber heated externally with steam as conventionally employed in the art.

The first concentrating stage is generally conducted at a temperature from about 75° C. to about 98° C. at a pressure of about 0.75 bar to about 0.99 bar for about 1 minute to about 6 minutes, the second stage at about 65° C. to about 90° C. at a pressure of about 0.45 bar to about 0.75 bar for about 1 minute to about 3 minutes, the third stage at about 60° C. to about 85° C. at a pressure of about 25 bar to about 0.55 bar for about 1 minute to about 3 minutes, and the fourth stage at about 45° C. to about 75° C. at a pressure of about 0.05 bar to about 0.40 bar for about 5 minutes to about 1.5 hours.

In a preferred embodiment, the first concentrating stage is conducted at about 85° C. to about 98° C. at a pressure of about 0.85 bar to about 0.95 bar for about 3 minutes to about 5 minutes, the second stage at about 80° C. to about 88° C. at a pressure of about 0.55 bar to about 0.70 bar for about 1.5 minutes to about 2.5 minutes, the third stage at about 70° C. to about 80° C. at a pressure of about 0.35 bar to about 0.45 bar for about 1.5 minutes to about 2.5 minutes, and the fourth stage at about 55° C. to about 65° C. at a pressure of about 0.10 bar to about 0.25 bar for about 10 minutes to about 20 minutes.

In a particularly preferred embodiment, the first stage is conducted at a temperature of about 97° C. at about 0.90 bar for about 4 minutes, the second stage at a temperature of about 87° C. at about 0.59 bar for about 2 minutes, the third stage at a temperature of about 76° C. at about 0.38 bar for about 2 minutes and the fourth stage at a temperature of about 59.5° C. at about 0.18 bar for about 15.5 minutes.

After concentration, the white must is blended with white wine vinegar, preferably derived from the same vintage as the white must, most preferably from Trebbiano grapes grown in the Modena region of Italy.

EXAMPLE

Trebbiano grapes from the Modena region of Italy were harvested, the vintage crushed and the must separated from the skins before the skins imparted any substantial coloration to the must. The separated must was concentrated in four stages according to the schedule in Table I below at a $H_2O$ evaporation rate of 11 tons/hour.

TABLE I

| STAGE | CHAMBER VOLUME | TEMPERATURE | PRESSURE | DURATION |
|---|---|---|---|---|
| Stage 1:* | 1.00 m³ | 97° C. | .90 bar | 4 minutes |
| Stage 2:* | .53 m³ | 87° C. | .59 bar | 2 minutes |
| Stage 3:* | .53 m³ | 76° C. | .38 bar | 2 minutes |
| Stage 4:* | 4.00 m³ | 59.5° C. | .18 bar | 15.5 minutes |

TABLE I-continued

| STAGE | CHAMBER VOLUME | TEMPERATURE | PRESSURE | DURATION |
|---|---|---|---|---|

*Natural Circulation
**Forced Circulation

The resulting concentrated white must was blended with a white wine vinegar having an acetic acid content of 7.6% and derived from the same vintage as the must. The amount of white wine vinegar in the blend was about 72% by volume and the amount of white must was about 28% by volume. The resulting white balsamic vinegar had an acetic acid content of 5.9%, exhibited a flavor profile similar to conventional balsamic vinegar and did not impart detectable undesirable discoloration when applied to poultry, fish, veal and light colored vegetables.

The above example was repeated except that the concentrated white must was cooked during the fourth stage for one hour at 110° C. The resulting must was dark red, and the resulting blend imparted noticeable undesirable discoloration to poultry, fish, veal and light colored vegetables. Conventional balsamic vinegar was also applied to poultry, fish, veal and light colored vegetables and imparted significant noticeable discoloration thereto.

Advantageously, the inventive white balsamic vinegar exhibits a basic flavor profile similar to that of conventional balsamic vinegar, but is significantly easier to produce since aging is unnecessary. The reason the white balsamic vinegar of the present invention exhibits a basic flavor profile similar to conventional balsamic vinegar is not known. However, it is believed that the balsamic flavor is attributed to the use of a natural white must. The reason the inventive balsamic vinegar does not undesirably or substantially discolor light colored foods is also not known, but is believed to be attributed to the use of a white must and white wine vinegar vis-a-vis red must and red wine vinegar used in producing conventional balsamic vinegar.

Various additives may be used with the white balsamic vinegar of the present invention. For example, flavorants such as spices and seasonings, such as cloves, cinnamon, cardamom and anise, may be added singly or in combination. Preservatives such as sulfites can also be used.

The white balsamic vinegar of the present invention enjoys utility in a variety of comestible products, such as white salad dressings and marinades and white sauces for poultry, fish, veal and other light colored meats and vegetables, unlike traditional red balsamic vinegar which causes undesirable staining.

While the invention has been described in relation to certain details, it is understood that variations and modifications may be made by those having ordinary skill in the art without departing from the scope of the invention.

I claim:

1. White balsamic flavor vinegar comprising a blend of concentrated white must and white wine vinegar.
2. White balsamic flavor vinegar according to claim 1, wherein the white must is derived from white grapes.
3. White balsamic flavor vinegar according to claim 1, comprising about 20% by volume to about 35% by volume white must and about 65% to about 80% white wine vinegar.
4. White balsamic vinegar according to claim 3, comprising about 25% by volume to about 30% by volume white must and about 70% to about 75% white wine vinegar.
5. White balsamic vinegar according to claim 4, comprising about 28% by volume white must and about 72% by volume white wine vinegar.
6. White balsamic flavor vinegar according to claim 1, wherein said white wine vinegar is derived from the same vintage as the white must.
7. White balsamic flavor vinegar according to claim 1, having an acetic acid content of from about 5.2% to about 7.0%.
8. White balsamic vinegar according to claim 7, having an acetic acid content of about 5.5% to about 6.2%.
9. White balsamic vinegar according to claim 8, having an acetic acid content of about 5.7% to about 6.0%.
10. White balsamic vinegar according to claim 9, having an acetic acid content of about 5.9%.
11. White balsamic vinegar according to claim 2, wherein the white grapes are Trebbiano grapes from the Modena region of Italy.
12. A comestible product comprising white balsamic vinegar according to claim 1.
13. A poultry sauce comprising white balsamic vinegar according to claim 1.
14. A fish sauce comprising white balsamic vinegar according to claim 1.
15. A vegetable sauce comprising white balsamic vinegar according to claim 1.
16. A salad dressing comprising white balsamic vinegar according to claim 1.
17. A marinade comprising white balsamic vinegar according to claim 1.
18. White balsamic flavor vinegar according to claim 1, further comprising a flavorant or spice.
19. White balsamic flavor vinegar according to claim 18, further comprising a component selected from the group of clove, cinnamon, cardamon, anise and mixtures thereof.
20. White balsamic flavor vinegar according to claim 1, further comprising a preservative.
21. White balsamic flavor vinegar according to claim 20, further comprising a sulfite preservative.
22. White balsamic flavor vinegar according to claim 1, wherein the concentrated white must is prepared by concentrating to about one third to about three quarters of its original volume.
23. White balsamic flavor vinegar according to claim 1, wherein the white must is concentrated to less than about one half of its original volume.
24. A method of producing white balsamic flavor vinegar, comprising concentrating white must and blending the concentrated white must with white wine vinegar.
25. A method of producing white balsamic flavor vinegar according to claim 24, comprising:

pressing white grapes;

separating the must from the skins before the skins impart any substantial coloration to the must;

concentrating the separated must to obtain a concentrated white must; and blending the concentrated white must with white wine vinegar.

26. A method according to claim 24, wherein the white wine vinegar is derived from the same vintage as the white must.

27. A method according to claim 24, wherein the white wine vinegar has an acetic acid content of from about 6.5% to about 9%.

28. A method according to claim 27, wherein the white wine vinegar has an acetic acid content of about 7% to about 8%.

29. A method according to claim 28, wherein the white wine vinegar has an acetic acid content of about 7.6%.

30. A method according to claim 24, wherein the white wine vinegar is substantially colorless.

31. A method according to claim 25, wherein the white grapes are Trebbiano grapes from the Modena region of Italy.

32. A method according to claim 25, wherein the must is separated from the skins immediately after pressing.

33. A method according to claim 25, wherein the must is concentrated to about ⅓ to about ¾ of its original volume.

34. A method according to claim 33, wherein the must is concentrated to less than about ½ of its original volume.

35. A method according to claim 25, wherein concentration is conducted at a temperature ranging from about 45° C. to about 99° C. for about 5 minutes to about 3 hours.

36. A method according to claim 25, wherein concentration is conducted in four stages.

37. A method according to claim 36, wherein the concentrating temperature decreases in each stage progressing from the first to the fourth stage.

38. A method according to claim 32 wherein the first concentrating stage is conducted at about 75° C. to about 98° C. at a pressure of about 0.75 bar to about 0.99 bar for about 1 minute to about 6 minutes, the second stage at about 65° C. to about 90° C. at a pressure of about 0.45 bar to about 0.75 bar for about 1 minute to about 3 minutes, the third stage at about 60° C. to about 0.55° C. at a pressure of about 0.25 bar to about 0.55 bar for about 1 minute to about 3 minutes, and the fourth stage at about 45° C. to about 75° C. at a pressure of about 0.05 bar to about 0.40 bar for about 5 minutes to about 1.5 hours.

39. A method according to claim 38, wherein the first concentrating stage is conducted at about 85° C. to about 98° C. at a pressure of about 0.85 bar to about 0.95 bar for about 3 minutes to about 5 minutes, the second stage at about a0° C. to about 88° C. at a pressure of about 0.55 bar to about 0.70 bar for about 1.5 minutes to about 2.5 minutes, the third stage at about 70° C. to about 80° C. at a pressure of about 0.35 bar to about 0.45 bar for about 1.5 minutes to about 2.5 minutes, and the fourth stage at about 55° C. to about 65° C. at a pressure of about 0.10 bar to about 0.25 bar for about 10 minutes to about 20 minutes.

40. A method according to claim 38, wherein the first stage is conducted at about 97° C. at a pressure of about 0.90 bar for about 4 minutes, the second stage at about 87° C. at a pressure of about 0.59 bar for about 2 minutes, the third stage at about 76° C. at a pressure of about 0.38 bar for about 2 minutes, and the fourth stage at about 59.5° C. at a pressure of about 0.18 bar for about 15.5 minutes.

41. A method according to claim 36, wherein the first concentrating stage is conducted in a chamber having a maximum volume of about 0.5 $m^3$ to about 1.5 $m^3$, the second stage in a chamber having a maximum volume of about 0.25 $m^3$ to about 0.75 $m^3$, the third stage in a chamber having a maximum volume of about 0.25 $m^3$ to about 0.75 $m^3$, and the fourth stage in a chamber having a maximum volume of about 2 $m^3$ to about 6 $m^3$.

42. A method according to claim 41, wherein the first concentrating stage is conducted in a chamber having a maximum volume of about 75 $m^3$ to about 1.25 $m^3$, the second stage in a chamber having a maximum volume of about 0.4 $m^3$ to about 6 $m^3$ the third stage in a chamber having a maximum volume of about 4 $m^3$ to about 6 $m^3$ and the fourth stage in a chamber having a maximum volume of about 3 $m^3$ to about 5 $m^3$.

43. A method according to claim 42, wherein the first concentrating stage is conducted in a chamber having a maximum volume of about 1.0 $m^3$, the second stage in a chamber having a maximum volume of about 0.53 $m^3$, the third stage in a chamber having a maximum volume of about 0.53 $m^3$, and the fourth stage in a chamber having a maximum volume of about 4.00 $m^3$.

44. A method according to claim 40, wherein the first concentrating stage is conducted in a chamber having a maximum volume of about 1.0 $m^3$, the second stage in a chamber having a maximum volume of about 0.53 $m^3$, the third stage in a chamber having a maximum volume of about 0.53 $m^3$, and the fourth stage in a chamber having a maximum volume of about 4.00 $m^3$.

45. A method according to claim 36, wherein concentration is conducted under vacuum.

46. A method according to claim 45, wherein concentration is conducted in a vacuum chamber heated externally by steam.

47. A method according to claim 45, wherein the vacuum progressively decreases from the first concentrating state to the fourth concentrating stage.

48. A method according to claim 25, wherein concentration is conducted by heating at temperatures less than 100° C.

49. The product produced by the process of claim 25.

50. The product produced by the process of claim 44.

* * * * *